UNITED STATES PATENT OFFICE.

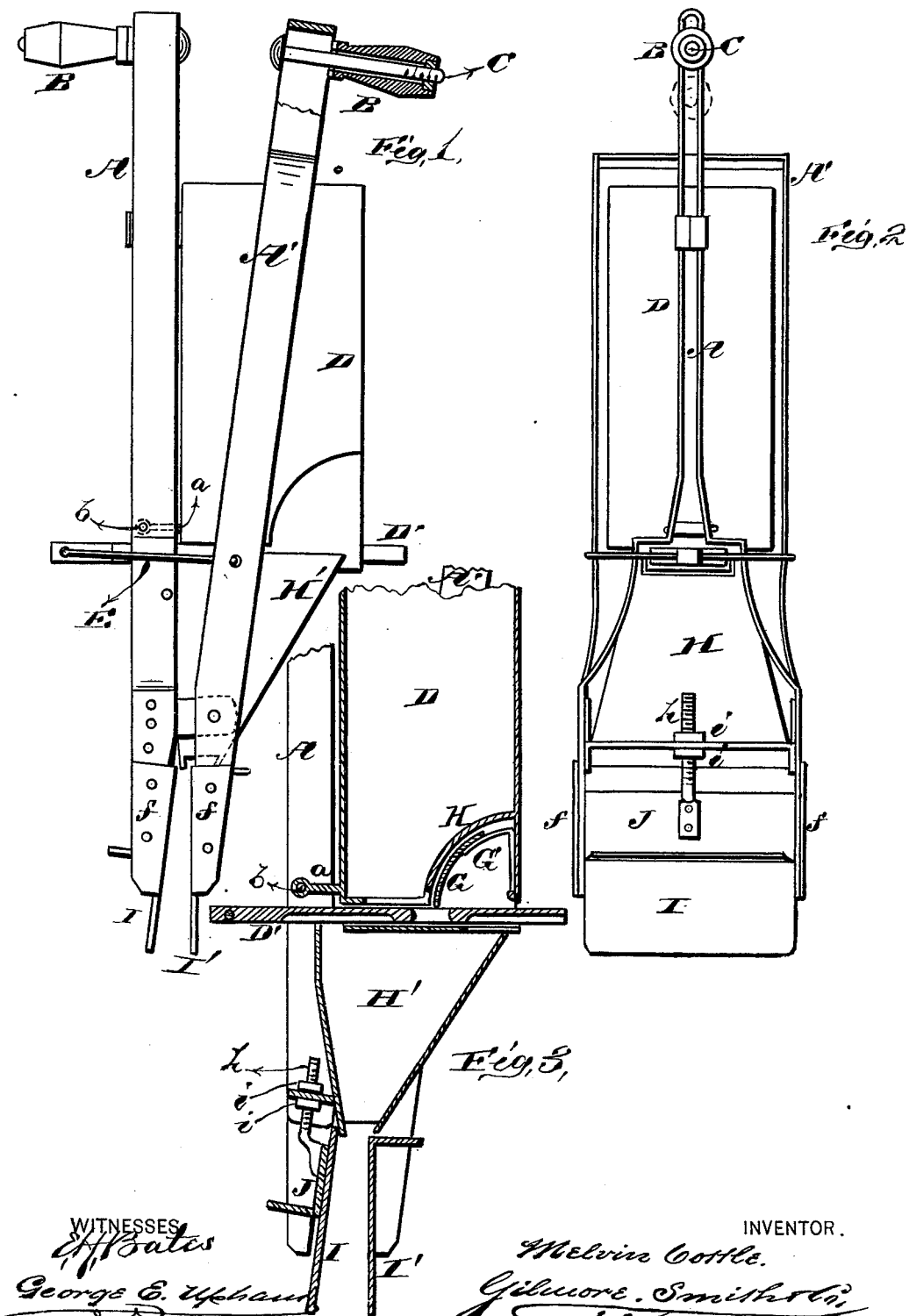

MELVIN COTTLE, OF RICHMOND, KANSAS.

IMPROVEMENT IN HAND CORN-PLANTERS.

Specification forming part of Letters Patent No. 195,350, dated September 18, 1877; application filed August 4, 1877.

*To all whom it may concern:*

Be it known that I, MELVIN COTTLE, of Richmond, in the county of Franklin and State of Kansas, have invented a new and valuable Improvement in Hand Corn-Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a part sectional front view of my hand corn-planter. Fig. 2 is a side view, and Fig. 3 is a vertical central sectional view thereof.

The nature of my invention consists in the construction and arrangement of a hand corn-planter, as will be hereinafter more fully set forth.

The annexed drawings, to which reference is made, fully illustrate my invention.

A A' represent the two levers which form the frame of my planter, said levers being each made of a single strap or bar of iron, bent substantially in the form shown in the drawing.

B B are the handles, which project from the levers A A' in opposite directions, each handle being screwed up tightly on a bolt, C, passed from the inside through the upper end of the lever. These handles may be loosened a little, and then moved up or down on the levers to suit the height of the operator.

D is the corn-box, attached to the lever A by means of an arm, a, projecting from the bottom of the box and fastened in the lever by a pin, b; and from near the upper end of the box project two hook-shaped arms, which hook in said lever and thus support the box. The lever A' straddles and passes over the corn-box, as shown.

In the bottom of the box D is a slide, D', connected to and operated by the lever A' by means of a wire spring, E, which passes through an eye in one end of the slide, and has its ends bent outward to form hooks, which are sprung from the inside into holes in the two arms of said lever A'.

The slide D' can easily be unhooked from the lever and drawn out for the purpose of substituting a slide with a different sized dropping-hole. Three of these slides are to be furnished with each planter, so that the operator can plant more or less in each hill, as he may desire.

Over the slide in the front part of the box is a metallic cut-off, G, which is provided with a spring, G', and works upon the arc of a circle, it being guided by a guard, H, inside the box.

The entire corn-box is so situated as to distribute or divide the weight of the planter to each hand alike.

By pulling out the handles the top of the box is left free to receive the corn without difficulty.

Below the box D is suspended a chute, H', to conduct the corn from the bottom of the box to the top of the blades I I', which latter are fastened, respectively, to the lower ends of the levers A A'. Each of these blades is formed with side flanges *f f*, which are riveted firmly to the arms of the levers, as shown, making it very substantial and durable.

The blade I is provided with an L-shaped sliding gage, J, for gaging the depth of planting, said gage being operated by means of a screw, *h*, with nuts *i i*.

It will be noticed that the entire planter is made of metal, which enables me to manufacture it comparatively cheap, and renders it strong and durable, while at the same time it can be made very light.

What I claim as new, and desire to secure by Letters Patent, is—

1. A seed-box, D, attached to the lever A by means of the arm *a*, projecting from the bottom of the box, and the hooks at the upper end, substantially as described.

2. In a seed-planter, a slide, D', connected to and operated by the lever A' by means of the spring-wire rod E, which is capable of being unhooked from the slide and lever, as and for the purpose set forth.

3. The metal cut-off G, with spring G', in combination with the curved guard H, box D, and slide D', substantially as and for the purposes set forth.

4. The combination of the slide D', the bowed spring E, with hook-shaped ends, and the lever A', substantially as and for the purposes set forth.

In testimony that I claim the above I have hereunto subscribed my name in the presence of two witnesses.

MELVIN COTTLE.

Witnesses:
WILLIAM H. STEIN,
CHAS. TALIAFERRO.